United States Patent [19]

Swanburg

[11] 4,284,028
[45] Aug. 18, 1981

[54] ENGLISH/METRIC CONVERSION MECHANISM FOR SPEEDOMETERS

[76] Inventor: Mark G. Swanburg, 2595 S. Julian, Denver, Colo. 80219

[21] Appl. No.: 12,237

[22] Filed: Feb. 14, 1979

[51] Int. Cl.³ .............................. G01P 3/42; H01F 7/06
[52] U.S. Cl. ........................................ 116/62.2; 73/2; 73/528; 116/DIG. 47; 335/219
[58] Field of Search ............ 116/62.1, 62.2, DIG. 47; 73/488, 513, 2, 528; 200/61.46; 74/12, 322; 192/84 R, 96; 335/219

[56] References Cited

U.S. PATENT DOCUMENTS

| 2,346,681 | 4/1944 | Harper | 74/12 X |
|---|---|---|---|
| 2,389,451 | 11/1945 | Moynihan | 116/232 X |
| 2,506,562 | 5/1950 | Wait | 74/12 |
| 2,657,919 | 11/1953 | McCandless | 73/527 X |
| 2,720,361 | 10/1955 | Halley | 235/103.5 |
| 2,900,465 | 8/1959 | Weiss | 200/61.46 |
| 3,070,202 | 12/1962 | Banker | 192/96 X |
| 3,295,356 | 1/1967 | La Fata | 73/528 X |
| 3,315,633 | 4/1967 | Rabinow | 116/232 |
| 3,399,577 | 9/1968 | Krumtinger | 74/12 X |
| 3,446,178 | 5/1969 | St. Clair et al. | 116/62.2 |
| 3,536,030 | 10/1970 | Schroeder | 116/233 |
| 3,566,827 | 3/1971 | Moseley et al. | 74/395 X |
| 3,921,567 | 11/1975 | Wildhaber et al. | 116/232 |
| 3,926,142 | 12/1975 | Okamoto | 116/62.2 |
| 3,948,208 | 4/1976 | Elliott | 116/233 |
| 4,173,147 | 11/1979 | Zathy | 116/62.2 X |

Primary Examiner—Daniel M. Yasich
Attorney, Agent, or Firm—John E. Reilly

[57] ABSTRACT

A conversion mechanism is attached to a speedometer in such a way that the input into the speedometer can be mechanically altered to establish a conversion ratio between a first system of units and a second system of units and the speedometer is indexed to display the speed measured in either system of units. The conversion apparatus is switchable between two modes to cause the speedometer to register selectively either of the two systems of units, and the apparatus is designed to be interposed at any point along the mechanical drive or input for the speedometer.

14 Claims, 5 Drawing Figures

ENGLISH/METRIC CONVERSION MECHANISM FOR SPEEDOMETERS

BACKGROUND OF THE INVENTION

The coexistence of two major systems of measurement; namely, the English system and the metric system, is of some concern to persons confronted with the necessity of converting measurements made in one system of units to corresponding measurements in the other system of units. This is due, to a large extent, to the fact that for each conversion, there is a different conversion factor, so that the multiplicity of conversion factors is difficult to retain by memory and the conversion factor is often inconvenient to obtain.

The need for simple mechanisms which will convert measurements made in an English system to measurements made in the metric system has increased in the last few years in the United States primarily because of the proposed change from the English system to the metric system in this country. One area of especial concern is the changeover required when automobile speeds are registered in kilometers per hour, as opposed to the present day miles per hour, since most automobile speedometers are indexed in miles per hour. There is therefore a need for a convenient mechanism which can be associated with those speedometers indexed in miles per hour to convert same over to kilometers per hour without altering the speedometer itself.

In the conversion between miles per hour and kilometers per hour, several solutions to the problem have been proposed: One has been to open the speedometer dial and replace the index plate with a plate calibrated in kilometers per hour, or to place a transparent "paste-over" over the dial so that the needle position could be read through the transparent "paste-over" with reference to the modified markings.

Another solution to the problem is proposed in U.S. Pat. No. 3,446,178 wherein a special speedometer is constructed with two dials on opposite sides of a disc, and this disc may be rotated between a "miles per hour" and a "kilometers per hour" position externally of the speedometer. By having a circular dial, however, the design of a speedometer is limited to a circular configuration, and there would be the requirement that every automobile be equipped with the speedometer described since it requires replacement of the entire unit. While U.S. Pat. No. 3,446,178 does provide a solution to the above-described problem, its structure does not lend itself to the attachment to existing speedometers on a wide variety of makes and models of automobiles.

In standard speedometers, the position of the speedometer needle is dependent upon the rate of revolution of the input speedometer cable. The reason is that the speedometer cable is connected to the speedometer, and, as it turns under the driving force of the vehicle, such as the transmission or a wheel, the speedometer cable rotates a magnetic disc within a metal cup which is attached to the dial pointer or needle of the speedometer. This metal cup is retained by a return spring, but the rotation of the magnetic disc induces eddy currents creating a torque proportional to the rate of disc rotation which in turn causes the dial pointer to move across the dial face. For a given rate of revolution, the eddy current torque will reach an equilibrium with the force exerted by the return spring, and the needle will register the speed of the vehicle. With this system, it therefore becomes possible to convert the speedometer reading from miles per hour to kilometers per hour by altering the rate of revolution of the speedometer cable by means of an appropriate conversion factor.

SUMMARY OF THE INVENTION

It is an object of the present invention to alter the rate of revolution of a speedometer cable so as to cause the speedometer dial and needle to selectively register miles per hour or kilometers per hour.

It is a further object of the present invention to utilize the index dial and needle of a speedometer to selectively register either miles per hour or kilometers per hour while avoiding any alteration to the speedometer.

Another object of the present invention is to provide a novel and improved mechanical gear conversion system which may be attached at any point along a speedometer cable of an automobile and which mechanical conversion system will alter the rate of revolution of the speedometer cable to reflect a conversion ratio wherein the speedometer indexing will selectively register either miles per hour or kilometers per hour.

It is yet another object of the present invention to provide a mechanical conversion system wherein the speedometer will selectively register miles per hour or kilometers per hour wherein the switching between the English and metric modes is accomplished by magnetic induction causing conversion gears to move into and out of selected engagement so as to alter the rate of revolution of the speedometer cable.

It is still a further object of the present invention to provide a simple, practical and durable conversion system which operates on the speedometer cable of an automobile and which may be attached at any point between the speedometer and the power drive of the speedometer cable so as to allow selection of two modes, the first mode not affecting the rate of revolution of the cable, and the second mode altering the rate of revolution of the cable to reflect a conversion ratio between the English and metric systems of measurement.

The present invention is a device attachable to the speedometer cable of an automobile so as to provide a means for altering the rate of revolution of that cable to reflect a conversion ratio between first and second systems of measurement; namely between English and metric systems of measurement. To accomplish this purpose, the device has an input shaft and an output shaft which may be connected at any point along the speedometer cable. Preferably its input is connected directly to the power source for turning the speedometer cable, whether that power source be an automobile transmission or a wheel, and the output shaft could similarly be connected directly to the speedometer, it being only necessary that the device interrupt the drive cable into the speedometer at some point ahead of the speedometer.

Once the input shaft of the conversion system is connected to the speedometer cable, this input shaft will rotate at the same rate of revolution as the speedometer cable from the transmission or wheel. The output shaft may then be connected to the input shaft so as to turn either at a rate of revolution identical to the input shaft so that the speedometer of the car will read in the units as originally designed or may turn at a ratio which converts the rate of revolution of the input shaft to a rate of revolution which will reflect the conversion ratio between English and metric units of measurement.

The preferred form of the present invention provides such conversion by having the input shaft drive a first gear, and this first gear in turn drives two intermediate gears. The intermediate gears turn at the same rate of revolution but have differing numbers of teeth or pitches. A pair of final gears are connected to the output shaft, with each of the final gears have a different pitch.

When in a first mode of operation, a spring or other resilient member biases the first intermediary gear into engagement with one of the final gears so that the output shaft is driven at a conversion ratio reflective of an English to metric conversion.

A switch is provided to activate the device so that, upon activation, a magnetic induction coil in the device overcomes the force of the biasing spring to move the above-described gears out of engagement and, with the same movement, engages the second intermediary gear with the other of the final gears to provide a direct drive between the input shaft and the output shaft so that the output shaft turns at the same rate of revolution as does the input shaft. In this manner, then, the speedometer will register the same units of measurements as originally intended. That is, in the second mode of operation, the speedometer will register units of measurement as if the conversion system were not present.

Other objects, advantages and capabilities of the present invention will become more apparent as the description proceeds taken in conjunction with the accompanying drawings in which:

DETAILED DESCRIPTION OF THE PREFERRED EMBODIMENT

The preferred form of the present invention is designed to convert the speedometer of an automobile so that it will register kilometers per hour rather than miles per hour, as is the case in most cars in the United States, although its adaptability to other speed measuring devices and applications hereinafter will become more apparent. The construction of a standard speedometer includes a speed indicator in units of a first system of measurement, such as, miles per hour. This speed indicator is driven by a rotatable drive member so that the rate of rotation of the drive member causes the speed indicator to register a level corresponding to that rate of rotation. The rotatable drive member in turn is driven by a motive drive source connected to the vehicle so that the motive drive source causes the rotatable drive member to rotate at a rate reflective of the vehicle's speed. Typically, the motive drive source is also a rotatable member to which a speedometer cable is connected, and the speedometer cable is rotated at a rate corresponding to the rotation of the motive drive source. In turn, the speedometer cable rotates the rotatable drive member of the speed indicator to cause the indicator to register a rate of speed corresponding to that rotation.

The preferred form of the present invention is adapted to be interposed in this system of driving the speed indicator so that the rate of rotation of the rotatable drive member may be selectively altered so as to cause the speed indicator to selectively register in different systems of units. Particularly, the conversion device in the preferred embodiment is adapted to cause a speed indicator indexed in miles per hour to selectively register miles per hour or kilometers per hour.

Figure 1:
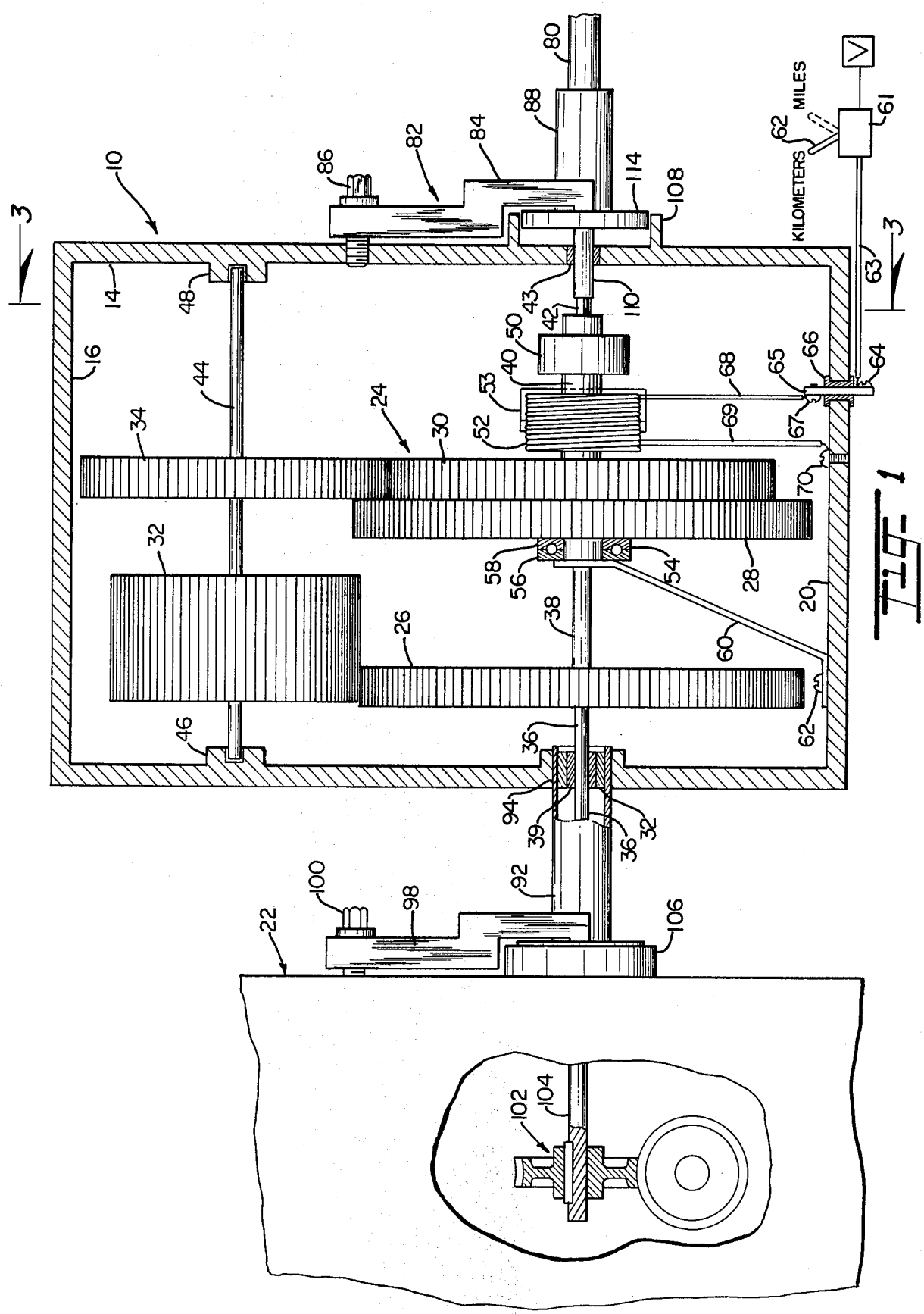
FIG. 1 is a cross-sectional view of the speed conversion device according to the present invention shown attached to a vehicle transmission and shown in a first state of operation.
Figure 2:
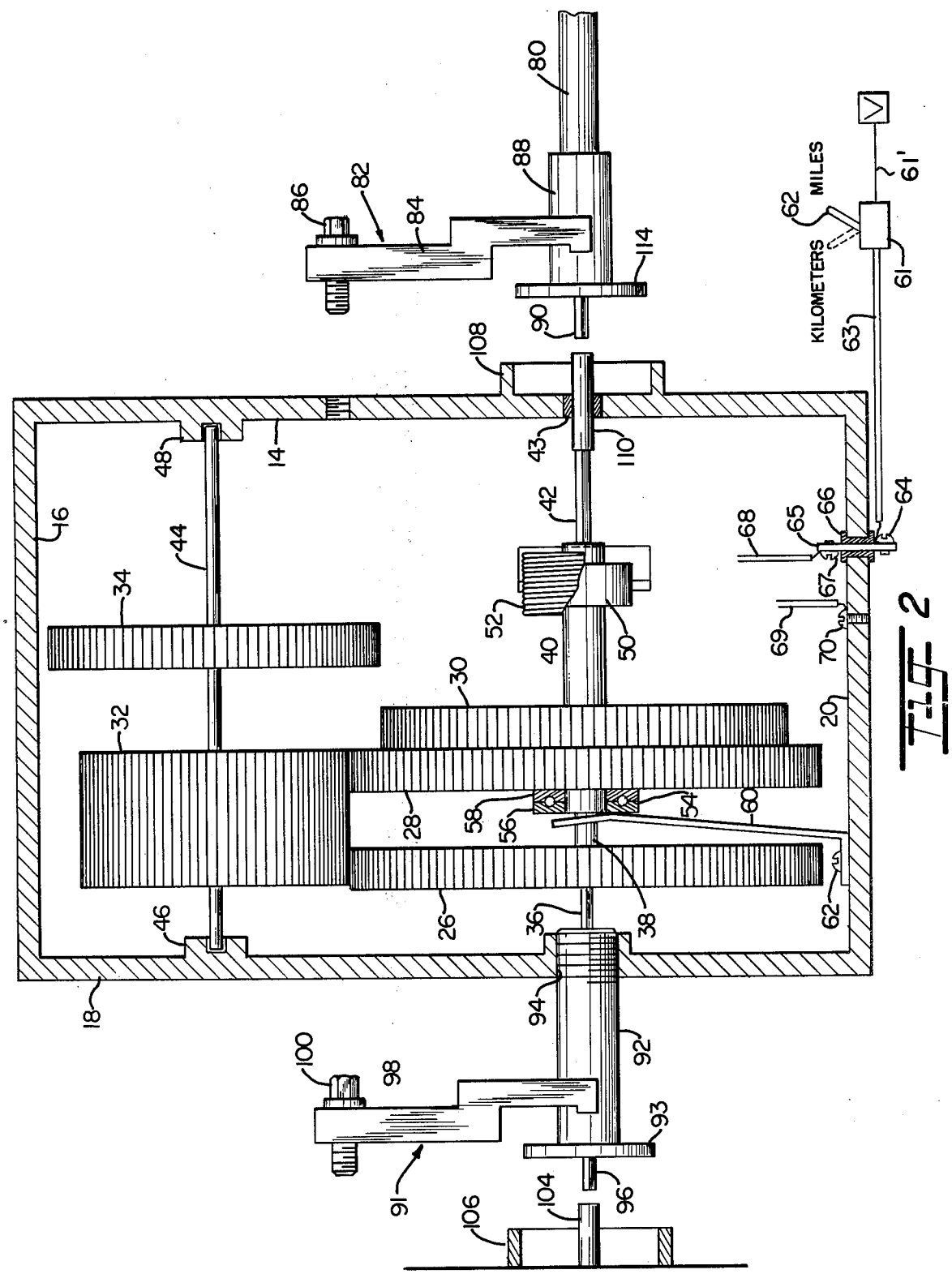
FIG. 2 is a partially exploded view shown in partial crosssection of the speed conversion device shown in FIG. 1 and in a second state of operation.

As may be seen in FIGS. 1 and 2, the preferred form of the present invention is shown wherein conversion unit 10 has a housing 12 with sidewalls 14, 15, 16, 17, 18 and 20 and a front wall and back wall (not shown) which completes the box-like construction of housing 12. Conversion unit 10 is adapted to be attached to transmission 22 as will be more fully described below. Housing 12 provides mounting for a gear train 24, the latter including a plurality of gears, 26, 28, 30, 32 and 34. In particular it may be seen in FIGS. 1 and 2 that gears 26, 28 and 30 are supported by an axial shaft assembly including shaft 36, sleeve 38, sleeve 40 and shaft 42. The cooperation of shafts 36 and 42 with sleeves 38 and 40 is described in greater detail below. Gears 32 and 34 are supported by shaft 44 which is mounted by means of bushings 46 and 48 oriented on sidewalls 14 and 18, respectively.

Figure 3:
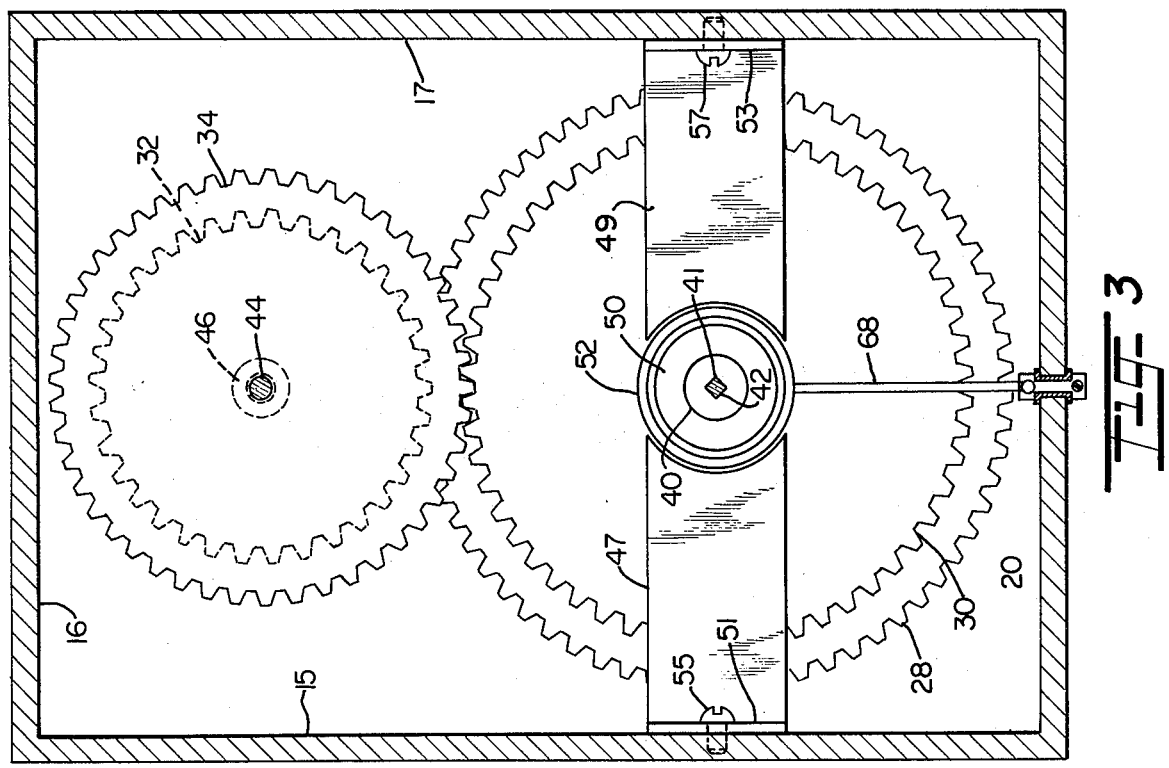
FIG. 3 is a cross-sectional view taken about lines 3—3 of FIG. 1.

Referring in more detail to FIGS. 1 and 2 showing the mounting of gear 26, 28 and 30, it should be recognized that gear 26 is securely attached to shaft 36 and sleeve 38 in any convenient manner. Hence, any rotation of shaft 36 will cause gear 26 and sleeve 38 to rotate correspondingly and shaft 36 operates as a rotatable input for gear train 24. Similarly, gears 28 and 30 are securely attached, in any convenient manner, to sleeve 40 so that any rotation of either gear 28 or gear 30 will cause a corresponding rotation of sleeve 40 and sleeve 40 provides a rotatable output for gear train 24. As shown in FIG. 3, shaft 42 is square shaped in cross-section and sleeve 40 is provided with a square shaped bore to receive a portion of shaft 42. In this manner, any rotation of sleeve 40 causes shaft 42 to undergo a corresponding rotation. Both shafts 36 and 42 are received by appropriate bearings in sidewalls 18 and 14, respectively, with shaft 36 operating as a rotatable input for conversion unit 10 and the shaft 42 operating as a rotatable output for conversion unit 10.

Specifically, as seen in FIG. 1, shaft 36 is supported by bearing 37 mounted in bracket 92. Since shaft 36 is square-shaped in cross-section, a suitable mounting sleeve 39 may be provided to form a rotatable secure support for shaft 36. Similarly, shaft 42 is received by elongated sleeve 110, as discussed below, and sleeve 110 is supported by bearing 43 in sidewall 14 so that a rotatable, secure support is provided.

Gears 32 and 34 are securely mounted, again by any suitable means, to rotatable shaft 44 so that rotation of one of gears 32 and 34 will cause rotation of the other of these gears. As noted above, shaft 44 is rotatably supported by bushings 46 and 48.

In operation in its first mode, as shown in FIG. 1, a rotatable drive force may be applied to shaft 36 as hereinafter described. When shaft 36 rotates, it imparts a rotation both to gear 26 and sleeve 38. However, since sleeve 38 is rotatable within sleeve 40 there is no force directly applied by shaft 36 to gears 28 and 30. Rather, gear 26, when driven by shaft 36, causes gear 32 to rotate which in turn causes shaft 44 to rotate. As set forth above, gear 34 is securely attached to shaft 44 so that when shaft 44 rotates gear 34 is rotated correspondingly. Gear 34 in turn engages gear 30 so as to cause gear 30 to undergo rotation and, since gear 30 is securely attached to sleeve 40, sleeve 40 is rotated as well. Sleeve 40 then drives rotatable shaft 42 which acts as the output for the conversion system.

It must be appreciated that, since the pitch, or number of teeth, of gears 26, 30, 32 and 34 differ, the rate of rotation of input shaft 36 is different from the rate of rotation of output shaft 42. The number of teeth on these respective gears is important for purposes of this invention since, by choosing the number of teeth correctly, a mechanical ratio is established whereby the rate of rotation of shaft 36 which would cause the speedometer of the automobile to register in miles per hour will now cause the speedometer to register kilometers per hour since shaft 42 rotates at a faster rate than shaft 36. These ratios are discussed in more detail below but it should be appreciated that, by rotating shaft 36 at a faster rate, a correspondingly greater eddy current is developed by the speedometer connected by its cable to shaft 42.

Several features are included in conversion unit 10 which allow the conversion unit to be switched between first and second operating modes, and this second mode is shown in FIG. 2. Specifically, sleeve 40 has a solid cylindrical iron plug 50 securely mounted thereon and a copper coil 52 is securely mounted to housing 12 so that sleeve 40 will pass axially through the hollow interior of coil 52. As shown in FIG. 3, coil 52 is secured to sidewalls 15 and 17. The mounting of coil 52 is accomplished by providing brackets 47 and 49 and securing coil 52 therebetween by means of epoxy or in any other convenient manner as known in the art. Bracket 47 has foot portion 51 and bracket 49 has foot portion 53 which are attached to sidewalls 15 and 17 respectively by screws 55 and 57.

A pancake bearing 54 including facing portions 56 and 58 is mounted on sleeve 40 to position the gears while allowing for rotation since facing portion 56 may rotate against face 58 with reduced friction. A leaf spring 60, is mounted on sidewall 20 by means of screw 62, the leaf spring 59 being biased so as to exert an axially directed force against facing portion 56 yielding urging the gear 30 into engagement with gear 34. However, when coil 52 is energized by an electric source as discussed below, the magnetic force created by coil 52 causes iron plug 50 to be drawn into the hollow interior of coil 52 thereby overcoming the force of leaf spring 60. As shown in FIG. 2, when coil 52 is energized this process forces gear 30 out of engagement with gear 34 and forces gear 28 into engagement with gear 32. This is further possible since sleeve 40 slidably receives both sleeve 38 and shaft 42.

In the second mode of operation shown in FIG. 2, coil 52 is energized so as to cause gear 28, gear 30, iron plug 50, sleeve 40, and pancake bearing 54 to move axially within housing 12 toward the transmission section. When this happens, rotation of shaft 36 which rotates gear 26 causes gear 28 to be driven at the same rate of rotation as gear 26 since both gear 26 and gear 28 directly engage gear 32. Hence, no conversion ratio or change in speed takes place and sleeve 40 is rotated at the same rate as shaft 36. Again, sleeve 40 causes shaft 42 to rotate so that now shaft 42 rotates correspondingly to that of shaft 36.

Figure 4:
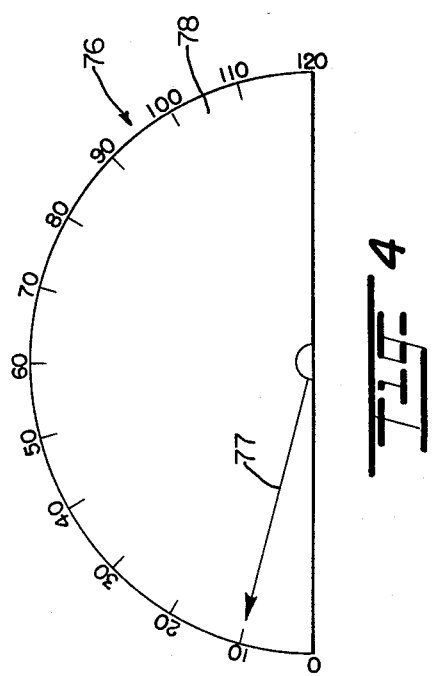
FIG. 4 is a diagramatic representation of a vehicle speedometer indicating a measurement in miles per hour.
Figure 5:
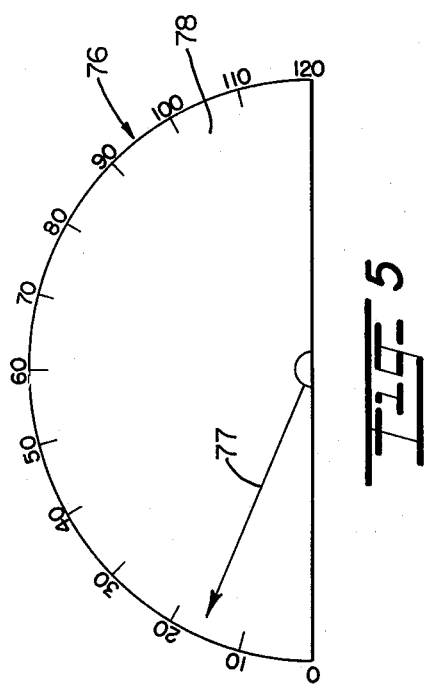
FIG. 5 is a diagramatic representation of a vehicle speedometer indicating speed in kilometers per hour.

An example of these two modes of operation may be seen in FIGS. 4 and 5 which are diagrammatic representations of the speedometer of an automobile. Both FIG. 4 and FIG. 5, the speedometer is indexed in miles per hour, but through means of the conversion device of the present invention it will indicate kilometers per hour as well as miles per hour. FIG. 4 shows pointer 77 of speedometer 76 indicating a rate of speed of 10 miles per hour. Assuming that this is the reading for the automobile without the conversion unit or with the conversion unit operating in its second mode wherein a direct ratio drive is achieved between shaft 36 and shaft 42, FIG. 5 then indicates the reading needle on speedometer 76 when the device is operated in the first mode, namely, the conversion mode, wherein shaft 42 is driven at a conversion ratio by means of gear train 24. In the second mode of operation, shaft 42 is rotated at a rate identical to shaft 36 so that the induced electric current causing pointer 10 to reach an equilibrium position at 10 miles per hour is due to its direct gear connection to shaft 36. On the other hand, when in the first mode of operation, for the same rate of rotation of shaft 36, shaft 42 is driven at a higher rate of rotation thereby inducing a greater current so that pointer 77 indicates approximately 16 on scale 78.

Switching between the two modes of operation, as mentioned before, is accomplished by coil 52 and iron plug 50, specifically by energizing coil 52 by passing electric current therethrough. Referring to FIGS. 1, 2 and 3, there is shown the electrical switching apparatus. A switch 61 is positioned at an appropriate location accessible to the operator of the vehicle for remotely activating the switching between the two modes. In the preferred embodiment, switch 61 is a toggle switch with toggle member 62, but it is to be understood that other switches could be utilized as well. One side of switch 61 is connected to the hot side of the vehicle's electrical system by wire 61 with the other side being connected to coil 52. The electrical connection of switch 61 to coil 52 is by means of wire 63 which is secured to a conductive post 65 by screw 64. Post 65 extends through sidewall 20 and is insulated from electrical contact by nonconductive grommet 66. Another wire 68 is attached to post 65 by screw 67 on the interior of unit 10, and wire 68 is then connected to coil 52. The return lead wire 69 from coil 52 is attached to ground, which is the vehicle itself, and this circuit may be completed by attaching wire 69 to sidewall 20 by means of screw 70.

When toggle switch 61 is in a first position that is when toggle member 62 designates kilometers, the electrical circuit is open so that no current flows through coil 52. This corresponds to the position of the gears shown in FIG. 1, and the conversion ratio is thereby introduced into the rotatable drive system for speedometer 76. On the other hand, when toggle switch 61 is in a second or "miles" position, the electrical path through coil 52 is completed and the gears are shifted to the second, direct drive mode, and no conversion ratio is obtained. This, then, corresponds to the position of the gear train shown in FIG. 2.

As mentioned above, conversion unit 10 is adapted to be attached to a vehicle speedometer, and it is only important that conversion unit 10 interrupt the motive drive source for the vehicle's speedometer at some point along the motive drive source. This interruption can occur directly off the transmission or wheel of the vehicle, at any point along the speedometer cable, or between the speedometer cable which is a rotatable drive for the speedometer and the rotatable input member of the speedometer itself which is coupled to the magnetic disc and cup assembly, the magnet causing the induced eddy current which positions the dial pointer 72. FIGS. 1 and 2 show the conversion unit 10 connected on one side to transmission 22 and on the other side to speedometer cable 80. Speedometer cable 80 has an attachment clamp assembly 82 which is designed for attachment to transmission 22. Clamp assembly 82 has a clamp arm 84 and a hex nut screw 86 which is adapted to secure clamp arm 84 against the housing of transmission 22. Clamp arm 84 in turn secures mounting bracket 88 which retains speedometer cable 80 in a conventional manner as is well known in the art. Mounting bracket 88 allows the elongated flexible shaft 90 of speedometer cable 88 to protrude so as to be connectable to a takeoff from the transmission of the vehicle.

In order to interpose conversion unit 10 between speedometer cable 80 and transmission 22, it is necessary to provide conversion unit 10 with a suitable adapter which can replace clamp assembly 82. To this end, the conversion unit 10, as shown in FIGS. 1 and 2, is provided with mounting bracket 92 which is threaded to attach into threaded bore 94 in sidewall 18 of conversion unit 10. Mounting bracket 92 is hollow and is provided with shaft 96 supported by suitable bearings as discussed earlier, and protrudes from the end of bracket 92. A clamp arm 98 which is similar to clamp arm 84 is then utilized to mount bracket 92 to the wall of transmission 22, and this mounting is accomplished by hex screw 100 which is threadably received by a bore in the side wall of transmission 22 in the same manner as if the clamp arm 84 for speedometer cable 80 were mounted by means of hex screw 86.

As shown in FIG. 1, transmission 22 has a gear assembly 102 rotated by the drive assembly of the vehicle, and gear assembly 102 has a takeoff shaft 104 which is rotated at a rate indicative of the vehicle's speed. Takeoff shaft 104 protrudes from transmission 22 and is centrally located within an upstanding surrounding rim 106 on the outer wall of transmission 22; and takeoff shaft 104 is journaled in suitable bearings, not shown, rotatably mounting shaft 104 in this position. Shaft 104 provides a motive drive source for speedometer 76 and together with cable 80 define rotatable drive members for the speedometer. As shown in FIG. 2, bracket 92 is provided with a shoulder 93 which is adapted to cooperate with rim 106 in positioning bracket 92 into proper alignment so that shaft 96 may be received by takeoff shaft 104 and thereby driven. As may be seen in FIG. 2, shaft 96 is received by shaft 104 so that the unit mates together and is there secured by means of clamp arm 98 and hex screw 100.

It should be appreciated that clamp assembly 91 is similar to clamp assembly 82 since clamp assembly 82 was designed to attach directly to transmission 22. In like manner, then, conversion unit 10 must be provided with a suitable mounting for speedometer cable 80 by means of clamp assembly 82. This is accomplished by providing side wall 12 with an upstanding surrounding rim 108 which is similar to rim 106. Rim 108 surrounds sleeve 110 which is rotatably mounted in side wall 12 by means of bearing 43. Sleeve 110 is rotated by shaft 42 and the sleeve 110 in turn receives shaft 90 so as to rotate shaft 90 of speedometer cable 80. Mounting bracket 88 has a surrounding shoulder 114 which cooperates with rim 108 and clamp arm 84 to align and position mounting bracket 88 on conversion unit 10. Clamp arm 84 is attached to sidewall 14 by means of bore 87 which threadably receives hex screw 86.

In the above-described manner, typically the rotatable force or output of gear assembly 102 may be mechanically transmitted to speedometer cable 80 and thereby to speedometer 70 so as to cause speedometer 70 to register the vehicle's speed. However, by mounting the conversion apparatus of the present invention at some point along the motive drive source of the speedometer, a mechanical conversion can be accomplished. As noted above, this mechanical conversion is accomplished by means of gear train 24 which is switchable between two modes and the conversion ratio is obtained by the selection of the appropriate gear ratios. A suitable ratio is accomplished wherein the gears have the following number of teeth on their circumference: gear 26=30 teeth, gear 28=30 teeth, gear 30=25 teeth, gear 32=15 teeth, and gear 34=20 teeth. As illustrated in FIG. 3, gears 26 and 28 each have 66 teeth, while gear 30 has 55 teeth, gear 32 has 34 teeth and gear 34 has 46 teeth, and in this manner provide approximately the ratio described above. In this manner the conversion ratio between miles per hour and kilometers per hour may fairly accurately be approximated for a rotatable input.

Specifically, by having these ratios, and gears 26 and 34 constructed as aforementioned, shaft 42 can be rotated at two rates and is switchable there between. When in the first mode or metric mode of operation, as shown in FIG. 1, shaft 36 rotates gear 26 which in turn rotates gear 32 and shaft 44. Since gear 32 has half as many teeth as does gear 26, it rotates twice as fast and, correspondingly, shaft 44 is rotated twice as fast. Since gear 30 has 25 teeth and gear 34 has 20 teeth, each revolution of gear 34 will cause gear 30 to revolve 0.8 revolution. Since, for each revolution of shaft 36, shaft 44 and therefore gear 34 revolves twice, therefore gear 30 and its associated shaft 32 will revolve two times 0.8 or 1.6 revolutions. The factor of 1.6 is the appropriate conversion factor for miles to kilometers since 1 mile approximately equals 1.6 kilometers.

When in the second mode of operation, there is no conversion since shaft 42 is driven by gear 28 which is directly coupled to gear 26 by means of gear 32 and so gear 28, by having the same number of teeth as gear 26, will rotate at the same rate as gear 26.

It should be readily understood by one of ordinary skill in the art that other gear ratios are possible which would result in a final ratio of 1.6 in order to convert from miles per hour to kilometers per hour. Further, if it were desired to convert the speedometer of a vehicle which was indexed in kilometers per hour to a reading of miles per hour, this device could be reversed so that shaft 36 would connect to the speedometer cable with shaft 42 being connected to the motive drive source of the vehicle's transmission or wheel. Further, other gear ratios could be devised to alter the rate of rotation of an output shaft so as to provide any desired conversion rate.

Since the above-described invention is able to be interposed along the motive drive of a speedometer, it should be recognized that it could be connected to a vehicle at any selected point along this motive drive train. Hence, it should be understood that the conversion apparatus 10 is universally attachable to any vehicle, the only change necessary being in the attachment bracket for a specifically manufactured vehicle.

Further, it should be appreciated that the above-described invention could be modified, by changing the gear ratio of the gear train, so as to be applicable to any system in which a conversion from one system of measurement to another system is desired and where the measurement sought to be converted is dependent on the rate of rotation of a drive member as opposed to the magnitude of displacement as taught in prior art devices.

Although the present invention has been described with a certain degree of particularity, it is understood that the present disclosure has been made by way of example and that changes in details and structure may be made without departing from the spirit and scope as defined by the appended claims.

What is claimed is:

1. A speed conversion apparatus adapted for attachment to a speed measuring device of a motor vehicle and the like wherein said speed measuring device has a rotatable drive member which is driven by a motive drive source and a speed indicator indexed in units of a first system of measurement to indicate the speed of said motor vehicle in response to the rate of rotation of said rotatable drive member, said speed conversion apparatus comprising:

a gear train interposed between said rotatable drive member and said speed indicator including a first set of gear members rotatable in response to rotation of said rotatable drive member to cause said speed indicator to indicate speed in units of the first system of measurement and a second set of gear members rotatable in response to rotation of said rotatable drive member to cause said speed indicator to indicate speed in a second system of measurement; and shifting means operatively arranged on shaft means of said gear train and adjacent to said gear train including first means to selectively shift said first set of gear members into a position in which said first set of gear members is rotatable in response to rotation of said rotatable drive member to cause said speed indicator to indicate speed in units of the first system of measurement and second means to selectively shift said second set of gear members to a position rotatable in response to rotation of said rotatable drive member to cause said speed indicator to indicate speed in units of the second system of measurement, and a shift activator operative to cause said shifting means to selectively shift one of said first and second sets of gear members into engagement with said rotatable drive member.

2. A speed conversion apparatus according to claim 1 wherein said second set of gear members is operative to cause said speed indicator to indicate a speed approximately 1.6 times that caused by said first set of gear members for a given rate of rotation of said rotatable drive member.

3. A speed conversion apparatus according to claim 1 wherein said first set of gear members and said second set of gear members have at least one gear in common to each said set.

4. A conversion apparatus for attachment to a speed indicating device of a vehicle and the like wherein said speed indicating device has a drive system including a plurality of rotatable elements and being indexed in units of a first system of measurement, said conversion apparatus comprising:

a rotatable input means connectable to a first element of said drive system;

a rotatable output means connectable to a second element of said drive system;

a gear train interconnecting said input and output means and including gear members operative to rotate said output means in response to rotation of said input means at a rate whereby the ratio of the rates of rotation of said output and input means is representative of a conversion ratio between said first system of measurement and a second system of measurement, said gear train having first and second sets of gear members, said first set of gear members operative to rotate said output means at a rate representative of said conversion ratio, said second set of gear members operative to rotate said output means at a rate substantially corresponding to the rate of rotation of said input means; and shifting means operatively arranged on shaft means of said gear train and adjacent to said gear train including magnetic induction means having an electrically conductive coil for magnetically inducing one of said pair of output gear members into engagement with said other of said common gears and biasing means for urging the second one of said pair of output gears into engagement with said intermediate gear and said first one of said output gears out of engagement with said other of said common gears, said shifting means including remote activating means for selectively activating said magnetic induction means.

5. A conversion apparatus according to claim 4 wherein said first and second sets of gears have at least one common gear.

6. A conversion apparatus according to claim 4 wherein said first and second sets of gears have at least two common gears, said rotatable input means causing rotation of a first one of said common gears and said first one of said common gears driving the other of said common gears.

7. A conversion apparatus according to claim 6 wherein said rotatable output means is connected to a pair of output gears and including an intermediate gear having a common drive shaft with said other of said common gears ad rotating therewith, a first one of said pair of output gears being engagable with a second one of said common gears, and a second one of said pair of output gears engagable with said intermediate gear.

8. A conversion appartus according to claim 4, said shifting means associated with said gear train to selectively shift between said first and second sets of gear members.

9. Apparatus for selectively converting the miles per hour indexing of a speedometer to kilometers per hour by mechanically altering the rate of rotation of the rotatable drive train associated with said speedometer, comprising:

a housing;

a gear train having a plurality of gear members in said housing;

an input shaft attachable to a first portion of said drive train for receiving rotational motion therefrom and connected to said gear train;

an output shaft connected to an output gear member and attachable to a second portion of said drive train, said gear train having first and second gear paths and operative to rotate said output shaft in response to rotation of said input shaft; and shift means operatively arranged on shaft means of said gear train and adjacent to said gear train for selectable shifting between said first and second gear paths, said first gear path operative to rotate said output shaft at the same rate as the rate of said input shaft and said second gear path operative to rotate said output shaft at an altered rate from the rate of said input shaft, said altered rate being at a ratio to reflect a conversion whereby said speedometer registers kilometers per hour.

10. Apparatus according to claim 9 wherein said second gear path rotates said output shaft approximately 1.6 times faster than said first gear path rotates said output shaft for a given rate of rotation of said input shaft.

11. Apparatus according to claim 9 wherein the gear ratio between said input gear and said first intermediate gear is approximately 2, the gear ratio between said second intermediate gear and the other of said output gears is approximately 4/5, said input gear and said one of said output gears having the same number of teeth, and said first and second intermediate gears being connected to rotate at the same rate.

12. Apparatus according to claim 11 wherein said input gear and one of said output gears have approximately 66 teeth, said other of said output gears has approximately 55 teeth, said first intermediate gear has approximately 34 teeth, and said second intermediate gear has approximately 46 teeth.

13. Apparatus according to claim 9 wherein said gear train includes an input gear member secured to said input shaft and a pair of output gear members secured to said output shaft, said input and output shafts axially aligned and rotatable independent of one another, whereby said input gear member and said output gear members have a common axis, and further including a pair of intermediate gears secured to a common rotatable shaft in spaced parallel relation with said common axis, one of said output gears being movable into and out of engagement with a first one of said intermediate gear and the other of said output gears being movable into and out of engagement with a second one of said intermediate gears.

14. Apparatus in accordance with claim 13 further including an electrical coil having a hollow interior mounted to said housing coaxially with said output shaft and switchable between active and passive states, a mass of a magnetic material secured to said output shaft, and a resilient biasing member operative to engage said second intermediate gear and said other of said output gears, said mass of magnetic material responsive to said active state of said coil to be attracted into the interior of said coil whereby the force of said biasing member is overcome thereby disengaging said other of said output gears and said second intermediate gear and engaging said one of said output gears and said first intermediate gear.

* * * * *